May 18, 1965 M. U. JOPPERI 3,183,595
MASON'S LINE HOLDER
Filed April 13, 1961
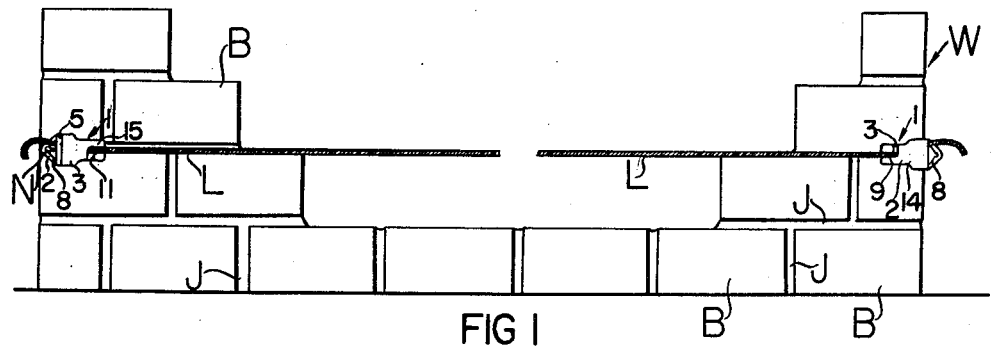
FIG 1
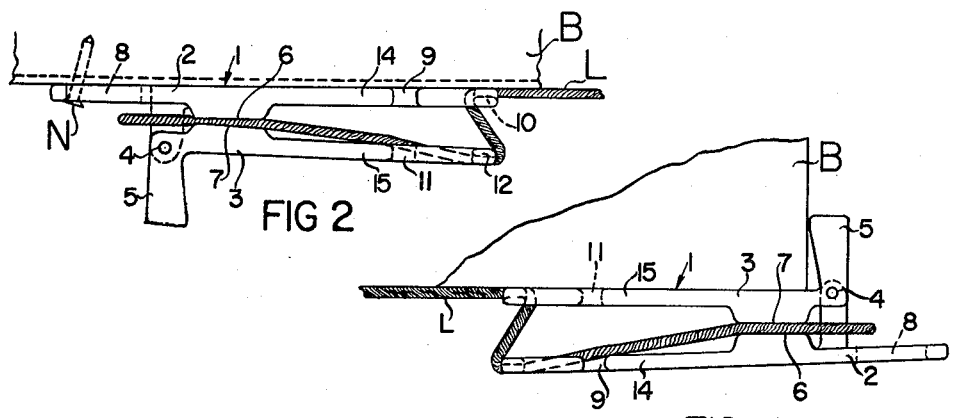
FIG 2
FIG 4
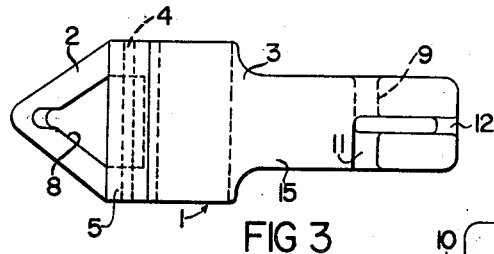
FIG 3
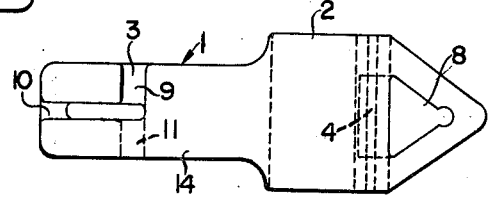
FIG 5
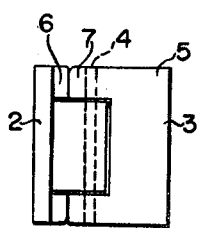
FIG 6
INVENTOR.
MATT U. JOPPERI
BY
Oberlin, Maky & Donnelly
ATTORNEYS

United States Patent Office 3,183,595
Patented May 18, 1965

3,183,595
MASON'S LINE HOLDER
Matt U. Jopperi, 1626 Ohio Ave., Ashtabula, Ohio
Filed Apr. 13, 1961, Ser. No. 102,720
3 Claims. (Cl. 33—85)

The present invention relates generally, as indicated, to a mason's line holder which is adapted to be hooked over the corner of, or a nail driven into, a masonry wall under construction and arranged to grip the line to hold it taut for use as a guide in laying courses of bricks or building blocks.

Hitherto masons have, for the most part, employed makeshift line holders such as wood scrap pieces or bent pieces of scrap iron or the like to which one end of the line is tied and on which the other end of the line is secured as by wrapping the line thereon. Such holders are apt to allow the line to slip and sag and, of course, when the length of the wall changes or when the next nail is driven into a different location it is a nuisance to unwrap the line from the holder and to rewrap the line thereon. It is also known in the art to provide wedge-type line gripping devices but these are not at all easy to adjust longitudinally along the line.

Accordingly it is one principal object of this invention to provide a mason's line holder which basically comprises two links that are hinged together for direct transverse gripping of the line between opposite jaws thereof.

It is another object of this invention to provide a simplified form of mason's line holder that is characterized by its ease of manipulation back and forth along the mason's line thereby facilitating adjustment to hold the line taut regardless of change in wall length corner-to-corner.

It is yet another object of this invention to provide a mason's line holder which is designed to grip the line with a force which is proportional to the tension of the line, thereby eliminating slippage while yet avoiding the necessity of employing a complex wedge gripping action as has been contemplated in the prior art.

Other objects and advantages of the present invention will become apparent as the following description proceeds.

To the accomplishment of the foregoing and related ends, the invention, then comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a fragmentary elevation view showing a building wall under construction with the mason's line in operating position to serve as a guide for the laying of a course of bricks or building blocks;

FIG. 2 is a top plan view of the mason's line holder constituting the present invention and showing the manner in which it is strung up to perform its gripping function when hooked over a nail in the wall as at the left side of FIG. 1;

FIG. 3 is a front elevation view as viewed from below FIG. 2, the nail and line having been omitted;

FIG. 4 is a top plan view of the present mason's line holder when hooked over the corner of the wall as at the right side of FIG. 1;

FIG. 5 is a front elevation view as viewed from below FIG. 4, the line having been omitted; and FIG. 6 is an end elevation view as viewed from the right hand side of FIG. 5.

Referring now in detail to the drawing, there is shown in FIG. 1 a masonry wall W in course of construction using bricks or building blocks B with mortar joints J therebetween. As is well-known practice in the erection of masonry walls, several courses at the corners or ends are generally built up first and then the successive courses of bricks or blocks B are laid therebetween. It is for the purpose of guiding the laying of the successive courses of bricks or blocks in a straight line between the corners that the mason employs a string or line L (usually a strong twisted cord), whereby, as each course is laid, the bricks or blocks may be predeterminedly positioned with respect to the line L. In this way, the completed building will have straight walls W and, of course, the corners will be erected plumb and the respective courses will be leveled as the corners are built up. Accordingly, the successive courses will likewise be level if the line L is level when stretched between the corners. After each course of bricks or blocks B has been laid and as the corners are progressively built up, the line L is raised at both ends to guide the laying of the next course.

The line holder 1 herein is shown as comprising links 2 and which which are hinged together as by the hinge pin 4, the link 2 being formed with a hook 5 which is shaped so that only its free end contacts the brick or block B at the corner (see FIG. 4). Jaw portions 6 and 7 of the links 2 and 3 adjacent pivot 4 are operative to grip the line L therebetween. One end of link 2 has an opening 8 therethrough for hooking over a nail N driven into the mortar joint J as in FIGS. 1 and 2.

Adjacent the other end, the link 2 is formed with an L-shaped line guide slot 9 which has smooth, rounded surfaces as shown so as to permit ready sliding of the line L therein. The transverse portion of slot 9 is open at one edge, and the longitudinal portion terminates in a groove 10 of depth corresponding to the thickness of line L.

Adjacent the other end, the link 3 is formed with an L-shaped slot 11. The transverse portion of slot 11 is open at one edge, and the longitudinal portion terminates in a groove 12 like groove 10. The rounded surfaces of slots 9 and 11 and grooves 10 and 12 prevent wearing or abrading of the line L and assure easy sliding of the line L therein.

When two holders 1 herein are assembled on a mason's line L as shown in FIG. 1 and in FIGS. 2 and 4, the mason, by holding the free end of the line L at either end, may pull the line L taut by spreading apart the ends 14 and 15 of the respective links 2 and 3 to release the grip of the jaws 6 and 7 on the line L therebetween. Usually, the mason will place one holder 1 around a corner or over a nail N and will shift the other holder 1 along the line L so that when the hook 5 is placed around the corner brick or block B or the opening 8 hooked over another nail N, the line L will be tightly stretched to provide a straight guide.

It is preferred to employ a holder 1 at each end of the line L so as to facilitate adjustment of the tension of the line L from either end.

As evident from FIGS. 2 and 4, the tension in the line L across the spaced ends 14 and 15 tends to move these ends of links 2 and 3 toward each other about the hinge pin 4 thereby causing the opposite ends of said links 2 and 3 to grip the line L between the jaws 6 and 7 with great leverage. It is to be noted that there is a substantial mechanical advantage because the slotted ends of the llinks 2 and 3 are disposed much farther away from the fulcrum 4 than are the line gripping portions 6 and 7.

Another feature of this invention is that the line L is held tight against the wall W under construction and, therefore, the bricks or building blocks B may be laid accurately with reference to the line L.

While in the foregoing description reference has been made only to the use of the present invention as a mason's line holder it will be evident to persons skilled in the art that the line holder 1 may be used for a multitude of different purposes, for instance, to tightly hold a clothesline. In that case, the opening 8 in link 2 may be placed over a hook or the like on the clothes pole or on the wall of the house or garage. Similarly, the line holder 1 herein may be used by a carpenter to tightly hold a chalk line for snapping a guide line for use as in applying siding or shingles on a frame building or house.

Other modes of applying the principle of the invention may be employed, change being made as regards the details described, provided the features stated in any of the following claims or the equivalent of such be employed.

I, therefore, particularly point out and distinctly claim as my invention:

1. A line holder comprising a pair of links pivotally connected together adjacent one end thereof, said links being formed with opposed gripping surfaces between one of the ends thereof and with spaced apart line guide portions adjacent the other end arranged so that a line passing under and over the respective spaced apart portions of said links and between such gripping surfaces is gripped between the latter by tension on the line tending to draw such spaced apart portions toward each other, one link having a hook at such one end for hooking over the corner of a masonry wall, and the other link having an opening at such one end for hooking over a nail in the masonry wall whereby either of said links may be connected to a masonry wall.

2. A line holder comprising a pair of links pivotally connected together adjacent one end thereof, said links being formed with opposed gripping surfaces between the ends thereof and with spaced apart line guide portions adjacent the other end arranged so that a line passing under and over the respective spaced apart portions of said links and between such gripping surfaces is gripped between the latter by tension on the line tending to draw such spaced apart portions toward each other, each link at said line guide portion having a transversely open L-shaped slot for passing of the line as aforesaid and a groove means operative to assist in retaining the line in said L-shaped slot.

3. A line holder comprising a pair of links pivotally connected together adjacent one end thereof, said links being formed with opposed gripping surfaces between the ends thereof and with spaced apart line guide portions adjacent the other end arranged so that a line passing under and over the respective spaced apart portions of said links and between such gripping surfaces is gripped between the latter by tension on the line tending to draw such spaced apart portions toward each other, each link at said line guide portion having a transversely open L-shaped slot for passing of the line as aforesaid, each transversely open L-shaped slot comprising a transverse portion open at one edge and a longitudinal portion terminating in grooves of a depth corresponding to the thickness of the line, the longitudinal portions of each L-shaped slot in said links being horizontally opposed to each other, and the transverse portions of each L-shaped slot extending in opposite directions from the longitudinal portions in the respective links.

References Cited by the Examiner

UNITED STATES PATENTS

| | | | |
|---|---|---|---|
| 58,419 | 10/66 | Howard | 24—133 |
| 195,026 | 9/77 | La Rue | 24—134 X |
| 446,522 | 2/91 | Huth et al. | 24—133 |
| 1,178,716 | 4/16 | Grippen | 24—133 |
| 2,505,935 | 5/50 | Batchler | 33—85 |

ISAAC LISANN, *Primary Examiner.*